No. 607,500. Patented July 19, 1898.
W. F. BRINTON.
BICYCLE.
(Application filed July 8, 1897.)
(No Model.) 2 Sheets—Sheet 1.

Witnesses
F. L. Ourand
J. A. Saul

Inventor
Wm. F. Brinton
per Geo. E. Waters
Attorney

No. 607,500. Patented July 19, 1898.
W. F. BRINTON.
BICYCLE.
(Application filed July 8, 1897.)
(No Model.) 2 Sheets—Sheet 2.
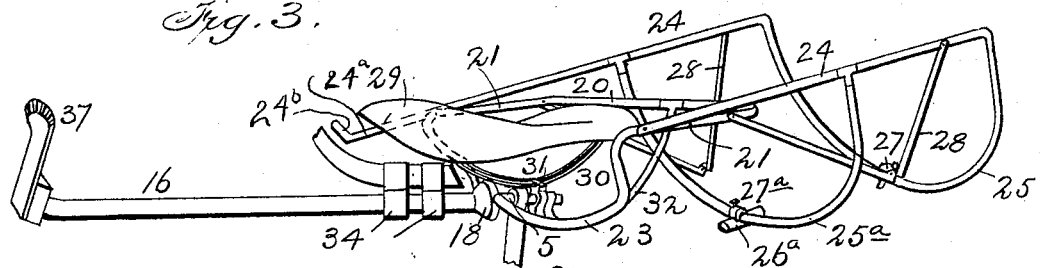
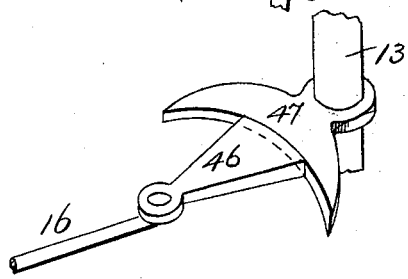
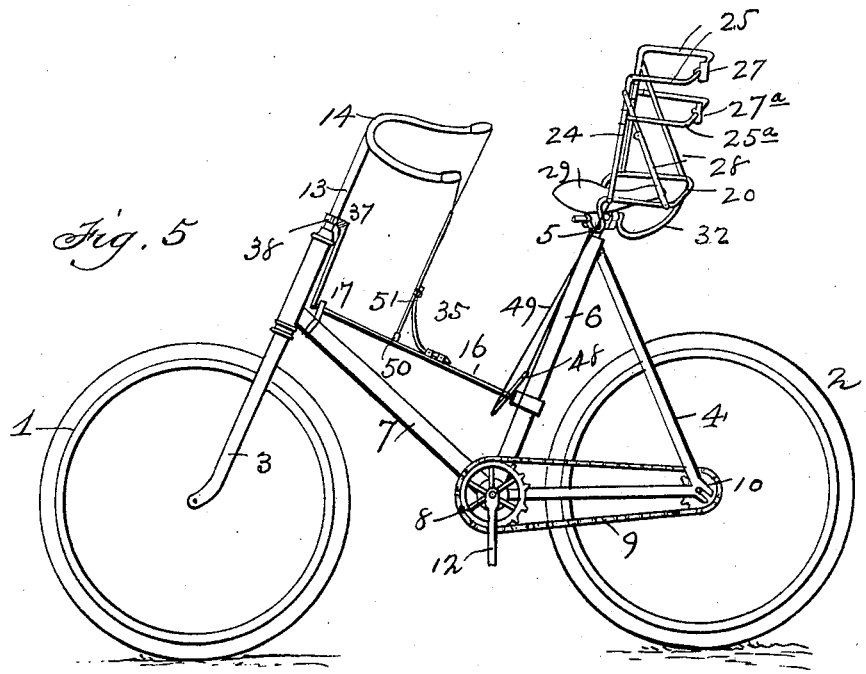
Witnesses
F. L. Ourand
J. A. Saul
Inventor
Wm F. Brinton
per Fred L. Tasker
Attorney

UNITED STATES PATENT OFFICE.

WILLIAM FRANKLIN BRINTON, OF WASHINGTON, IOWA.

BICYCLE.

SPECIFICATION forming part of Letters Patent No. 607,500, dated July 19, 1898.

Application filed July 8, 1897. Serial No. 643,927. (No model.)

*To all whom it may concern:*

Be it known that I, WILLIAM FRANKLIN BRINTON, a citizen of the United States, residing at Washington, in the county of Washington and State of Iowa, have invented certain new and useful Improvements in Bicycles; and I do hereby declare the following to be a full, clear, and exact description of the invention, such as will enable others skilled in the art to which it appertains to make and use the same.

My invention relates to bicycles; and its object is to provide means whereby the steering-bar is actuated to turn the guiding-wheel by the movement to one side or the other of the body of the rider, thus enabling the rider to sit upright upon the seat and avoiding the unsightly and injurious bending forward of the body to grasp the handle-bar.

The invention consists in the novel construction and combination of parts hereinafter fully described and claimed.

Figure 1:
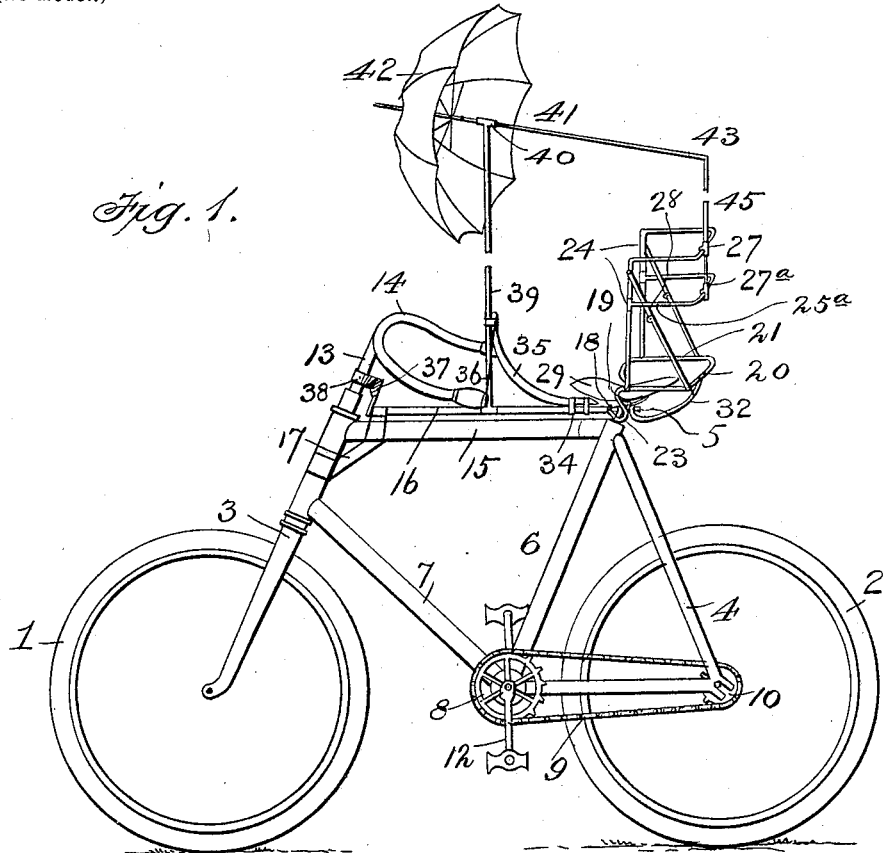
Figure 2:
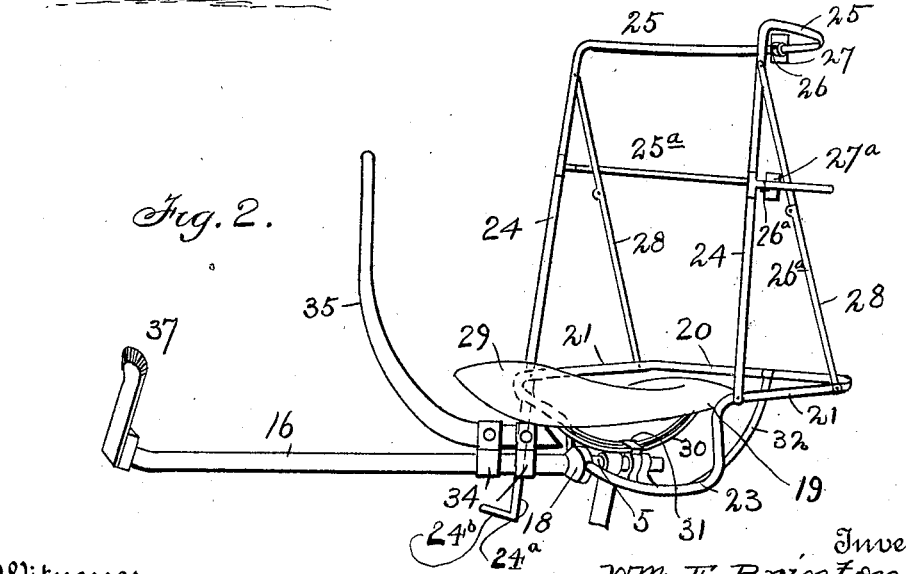

In the accompanying drawings, Figure 1 is a perspective view of a bicycle constructed in accordance with my invention. Fig. 2 is a detail perspective view, on an enlarged scale, of the seat, seat-frame, and oscillating shaft. Fig. 3 is a similar view showing the seat-frame knocked down to enable a rider to mount the bicycle. Fig. 4 is a detail perspective view showing a modification of the means for operating the steering-bar. Fig. 5 is a view showing my invention applied to a lady's bicycle.

In the said drawings, referring now to Figs. 1, 2, and 3, the reference-numeral 1 designates the front wheel, 2 the rear wheel, 3 the front fork, 4 the rear fork, 5 the seat-suporting bar, 6 and 7 the connecting-bars, 8 the sprocket-wheel, 9 the sprocket-chain, 10 the sprocket-pinion, 12 the cranks, 13 the steering-bar, 14 the handle-bar, and 15 the upper connecting-bar, of an ordinary bicycle.

Located above the connecting-bar 15 is an oscillating shaft 16, the front end of which is journaled in a bracket 17, secured to the socket of the front fork, and at its rear end is journaled in a socket 18, secured to the upper end of the seat-supporting bar 5. Rigidly connected with said shaft, near its rear end, is a rearwardly extending-bar 19, comprising the transverse portion 20, the parallel side arms 21, and the downwardly and inwardly curved ends 23. Pivotally connected with said arms 21 are upwardly-extending tubes 24, which are curved rearwardly and inwardly, forming arms 25, the ends of which telescope into each other, so that they may be adjusted to fit the body of the rider, and are held in place by a set-screw 26, which also passes through a socket 27. Similar arms 25$^a$ are secured to said tubes 24, provided with a socket 27$^a$ and a set-screw 26$^a$. Pivoted to the tubes 24 are toggle-jointed brace-bars 28, the lower ends of which are pivoted to the rear ends of the side arms 21. The tube 24 at the right of the bicycle is extended downwardly, forming an arm 24$^a$, the lower end of which is bent outwardly, forming a short arm 24$^b$, for a purpose hereinafter explained. The frame thus constructed, and which I term the "seat-frame," when in use occupies the position shown in Fig. 1, but when knocked down to enable the rider to mount the bicycle occupies the position shown in Fig. 3.

The numeral 29 designates the seat mounted upon springs 30, secured to a clamp 31 on the rear end of the oscillating shaft. Also secured to said clamp and to the rear portion 20 of the frame is a brace-bar 32.

Located in front of the seat and secured to the oscillating shaft by clamps 34 is a curved bar 35, to the upper end of which are also connected rods 36, which are connected, respectively, with the handles of the handle-bar.

The front end of the oscillating shaft is provided with a cogged segment 37, which meshes with a bevel-pinion 38, fixed to the steering-bar.

The numeral 39 designates an upright tube secured to the said shaft and to the curved arm or bar 35, provided at its upper end with a socket 40, through which passes the stick 41 of an umbrella 42. The rear end of the umbrella-stick engages with a socket 43 on the upper end of a rod 45, passing through and held in position by the sockets 27 and 27$^a$. The umbrella may thus act as a sail to aid in propelling the bicycle.

The operation will be readily understood. When the rider swings his body to one side or the other, the seat-frame will turn the shaft 16, which, through the medium of the cogged segment and bevel-pinion and the arm 35 and connecting-rods, will turn the steering-bar and front wheel in a direction the opposite to that in which the said frame is turned, and thus guide the bicycle.

In Fig. 4 I have shown a cam 46 and cam-segment 47, which may be substituted for the segment 37 and pinion 38 for turning the steering-bar.

In Fig. 5 I have shown my improvements applied to a lady's bicycle. In this case the oscillating shaft is located some distance below the seat-frame and handle-bar, and is provided at the rear with two arms 48, connected by cross-bars 49 with the seat-frame. It is also provided with a lug 50, to which is secured rods 51, secured to the handles of the handle-bar. The operation in this case will be similar to that described above. The purpose of the arms $24^a$ and $24^b$ is to automatically raise the seat-frame as the rider mounts the bicycle. As stated, these arms are at the right of the bicycle, and as the rider swings himself into the latter his right leg will strike said arms and elevate the frame.

Having thus fully described my invention, what I claim as new, and desire to secure by Letters Patent, is—

1. In a bicycle, the combination with the oscillating shaft and means connected therewith for turning the steering-bar, and the seat secured to said shaft, of the oscillating seat-frame comprising the lower bar secured to said shaft, the upright tubes pivoted thereto, and having their upper ends curved rearwardly and inwardly and the toggle-joint brace-bars, substantially as described.

2. In a bicycle, the combination with the oscillating shaft, and means connected therewith for operating the steering-bar, and the seat secured to said shaft, of the oscillating seat-frame comprising the lower bar secured thereto, the upright tubes pivoted thereto, the upper ends of which are curved rearwardly and inwardly, telescoping with each other, the set-screw and the toggle-joint brace-bars, substantially as described.

3. In a bicycle, the combination with the oscillating shaft and means connected therewith for turning the steering-bar, and the seat secured to said shaft, of the oscillating knockdown seat-frame comprising the lower bar secured to said shaft, the upright tubes pivoted thereto and having their upper ends curved rearwardly and inwardly, and one of said tubes extended downwardly below the seat and having its end bent outwardly, substantially as described.

In witness whereof I have hereunto set my hand this 14th day of May, 1897.

WILLIAM FRANKLIN BRINTON.

Witnesses:
A. S. FOLGER,
W. F. NOBLE.